United States Patent
Kölker et al.

(10) Patent No.: US 9,963,306 B2
(45) Date of Patent: May 8, 2018

(54) PALLETIZING DEVICE FOR A PILING OF FILLED SACKS

(71) Applicant: Windmöller & Hölscher KG, Lengerich (DE)

(72) Inventors: Martin Kölker, Ibbenbüren (DE); Ralf Ahlers, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 0 days. days.

(21) Appl. No.: 14/696,503

(22) Filed: Apr. 27, 2015

(65) Prior Publication Data

US 2015/0307291 A1 Oct. 29, 2015

(30) Foreign Application Priority Data

Apr. 28, 2014 (DE) .......................... 10 2014 105 933

(51) Int. Cl.
*B65G 57/02* (2006.01)
*B65G 57/24* (2006.01)
(Continued)

(52) U.S. Cl.
CPC .............. *B65G 57/10* (2013.01); *B65G 57/03* (2013.01); *B65G 57/22* (2013.01); *B65G 47/086* (2013.01);
(Continued)

(58) Field of Classification Search
CPC .. B65G 47/086; B65G 57/24; B65G 47/2445; B65G 47/841; B65G 57/22; B65G 57/245; Y10S 414/11
(Continued)

(56) References Cited

U.S. PATENT DOCUMENTS 2,971,659 A * 2/1961 Miller, Jr. ............ B65G 47/086
198/374
3,257,005 A * 6/1966 Annable et al. ....... B65G 57/22
414/792.2
(Continued)

FOREIGN PATENT DOCUMENTS

DE  1275468  8/1968
DE  4404017  8/1995
(Continued)

OTHER PUBLICATIONS

Pruefungsantrag [Request for Examination] Dated Mar. 11, 2016 From the Deutsches Patent—und Markenamt [German Patent and Trademark Office] Re. Application No. 102014105933.6 and Its Translation Into English.
(Continued)

*Primary Examiner* — Gregory W Adams

(57) ABSTRACT

A palletizing device for a piling of layers from at least two rows of filled sacks to a sack stacking comprising a sliding device with a sliding area for the formation of a layer of filled sacks and a supply device with at least a conveyor belt for the supply of filled sacks in a feed position on the sliding area, wherein the sliding device comprises a sliding table beneath the sliding area and a slider for sliding of the filled sacks from a sliding position on the sliding area on the sliding table, wherein the conveyor belt is performed in a way that a supply distance between a feed position and the sliding position is smaller than a sliding distance between the sliding position and a frame of the sliding device at the supply edge of the conveyor belt.

11 Claims, 5 Drawing Sheets

(51) Int. Cl.
- *B65G 57/10* (2006.01)
- *B65G 57/03* (2006.01)
- *B65G 57/22* (2006.01)
- *B65G 47/08* (2006.01)

(52) U.S. Cl.
CPC ........... *B65G 2201/0238* (2013.01); *B65G 2203/0233* (2013.01); *B65G 2812/02128* (2013.01); *B65G 2814/0305* (2013.01)

(58) Field of Classification Search
USPC ........ 198/426, 431, 460.3, 462.1; 414/791.4, 414/791.6, 791.8, 792, 792.5, 792.6, 414/792.7, 793.4, 794.2, 794.7, 794.8, 414/799
See application file for complete search history.

(56) References Cited

U.S. PATENT DOCUMENTS

| | | | | |
|---|---|---|---|---|
| 3,257,015 | A * | 6/1966 | Annable | B65G 57/22 414/792.2 |
| 3,294,257 | A | 12/1966 | Davies et al. | |
| 3,404,788 | A * | 10/1968 | Thomas | B65G 57/26 100/7 |
| 4,000,820 | A * | 1/1977 | Kurk | B65G 57/22 414/791.8 |
| 4,026,422 | A * | 5/1977 | Leenaards | B65G 47/086 198/374 |
| 4,352,616 | A * | 10/1982 | Brenner | B65G 57/22 198/374 |
| 4,593,517 | A * | 6/1986 | Mattila | B65B 35/50 53/441 |
| 4,614,473 | A * | 9/1986 | Kwauka | B65G 61/00 198/430 |
| 4,708,564 | A * | 11/1987 | Mylrea | B65G 57/035 414/789.1 |
| 4,711,612 | A * | 12/1987 | Kwauka | B65G 57/06 414/792.6 |
| 5,383,760 | A * | 1/1995 | Cawley | B65G 47/2445 198/415 |
| RE35,066 | E * | 10/1995 | Martin | B65G 47/086 414/791.6 |
| 5,507,616 | A * | 4/1996 | Perobelli | B65G 57/00 198/781.01 |
| 5,533,861 | A * | 7/1996 | Klupfel | B65B 35/40 198/468.6 |
| 5,540,545 | A * | 7/1996 | Roberts | B65G 57/245 414/789.6 |
| 5,758,471 | A * | 6/1998 | Denley | B65B 35/50 53/399 |
| 6,974,299 | B2 * | 12/2005 | Prakken | B65G 47/766 198/426 |
| 7,631,747 | B2 * | 12/2009 | Zeitler | B65G 43/08 198/460.1 |
| 7,726,463 | B2 * | 6/2010 | Aronsson | B65G 47/086 198/419.2 |
| 7,874,417 | B2 * | 1/2011 | Oppici | B65G 47/841 198/419.2 |
| 8,074,431 | B1 * | 12/2011 | Pierson | B65G 47/086 414/791.6 |
| 8,092,144 | B2 * | 1/2012 | Germain | B65G 47/086 198/431 |
| 2004/0223839 | A1 * | 11/2004 | Simkowski | B65G 17/005 414/791.6 |
| 2011/0076128 | A1 * | 3/2011 | Johnsen | B65G 21/14 414/791.6 |

FOREIGN PATENT DOCUMENTS

| | | |
|---|---|---|
| EP | 0780327 | 6/1997 |
| GB | 2291393 | 1/1996 |

OTHER PUBLICATIONS

Europaeischer Recherchenbericht und die Stellungnahme zur Europaeischen Recherche [European Search Report and the European Search Opinion] Dated Sep. 22, 2015 From the European Patent Office Re. Application No. 15156459.8.

Translation Dated Dec. 21, 2015 of European Search Opinion Dated Sep. 22, 2015 From the European Patent Office Re. Application No. 15156459.8.

Prüfungsantrag [Examination Report] Dated Jul. 25, 2017 From the Deutsches Patent—und Markenamt [German Patent and Trademark Office] Re. Application No. 102014105933.6 and Its Summary in English. (8 Pages).

* cited by examiner

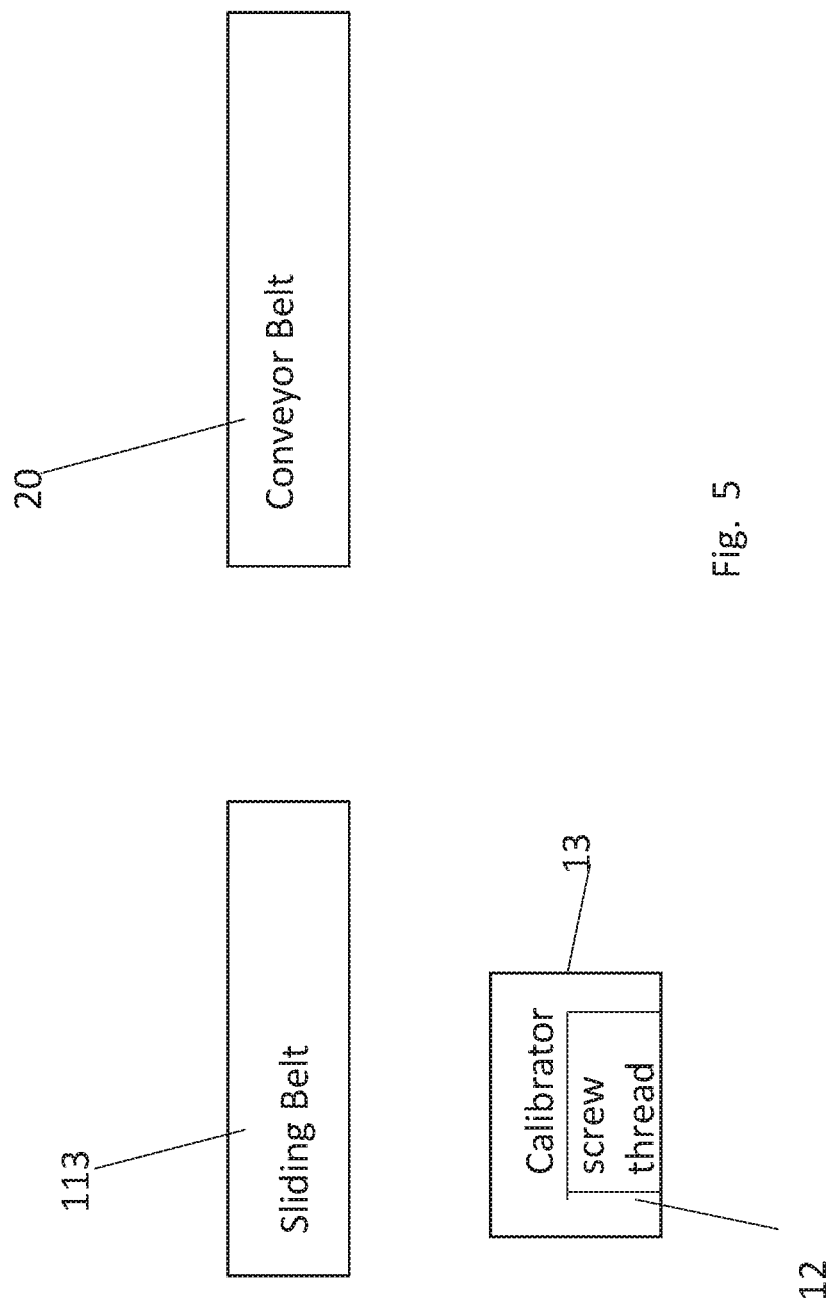

PALLETIZING DEVICE FOR A PILING OF FILLED SACKS

RELATED APPLICATION

This application claims the benefit of priority of German Patent Application No. 10 2014 105 933.6 filed Apr. 28, 2014, the contents of which are incorporated herein by reference in their entirety.

BACKGROUND OF THE INVENTION

The present invention relates to a palletizing device for a piling of layers of at least two rows of filled sacks to a stack of sacks.

It is known that palletizing devices are used in order to pile filled sacks in layers on top of one another and perform a sack stacking. Such a sack stacking can for example be performed on a pallet so that it is subsequently transportable with the help of the pallet. The transport can thereby occur to a depository at which the sack stacking is deposited or at least temporarily stored on the pallet. In order to generate the sack stacking known palletizing devices are normally configured with a sliding device and a supply device. The supply device conveys the filled sacks on the sliding area of the sliding device, so that there the corresponding layers can be configured. Thereby it is crucial that a handover point exists on which the corresponding filled sack exits the supply device and arrives on the sliding area. This position can also be defined as a feed position of the supply device for the filled sack. In order to however subsequently obtain the corresponding layer, particularly the defined overview on the sliding device, particularly on the sliding area, a conveying movement of the filled sack must occur from this feed position into a sliding position. This sliding position is particularly a final position in the defined overview of this layer. This conveyance movement between the feed position and the sliding position takes time and correspondingly effort. Particularly the required time for this movement is a disadvantage for the total duration of the palletizing process. Normally, with known palletizing devices the conveyor belt is assembled lateral to the sliding area. This leads to the fact that the corresponding supply distance is performed relatively large since the filled sack has to be inserted completely into the sliding device at the end of the supply device. By this large length, namely the large supply distance between the feed position and the sliding position, a high time requirement is necessary which disadvantageously affects the time requirement for the complete palletizing process.

SUMMARY OF THE INVENTION

It is an object of the present invention to at least partially avoid the previously described disadvantages. Particularly, it is the object of the present invention to reduce the palletizing duration with a palletizing device according to the invention in a cost efficient and simple manner.

The previous object is solved by a palletizing device with the features of claim 1. Further features and details of the invention result from the dependent claims, the description and the drawings. Thereby, the features and details which are described corresponding to the palletizing device according to claim 1 naturally also apply in correspondence with the palletizing device according to the dependent claims and vice versa, so that according to the disclosure of the single aspects of the invention it can always be reciprocally related to.

A palletizing device according to the present embodiments serves for the piling of layers of at least two rows of filled sacks to a sack stacking. Therefore the palletizing device according to the present embodiments comprises a sliding device with a sliding area for the performance of a layer of filled sacks. Further, a supply device is intended with a conveyor belt for the supply of filled sacks in the feed position on the sliding area. Thereby, the sliding device comprises a sliding table beneath the sliding area and a slider for sliding of the filled sacks from the sliding position on the sliding area on the sliding table. A palletizing device according to the present embodiments may be distinguished by the fact that the conveyor belt is configured in a way that the supply distance between the feed position and the sliding position is smaller than a sliding distance between the sliding position and a frame of the sliding device at the supply edge of the conveyor belt.

A palletizing device according to the present embodiments thereby aims to the geometrical correlation between the feed position and the sliding position. Particularly due to the performance of the supply device according to the invention and particularly the conveyor belt, an extension of the conveyor belt in the frame of the sliding device and thereby also in the frame of the palletizing device is possible. The supply distance is performed accordingly smaller than the sliding distance so that the feed position of the filled sack is also completely in the frame of the sliding device. Compared to known palletizing devices with which generally the supply distance is greater than the sliding distance and correspondingly the conveyor belt is outside the sliding device and also outside the palletizing device, in this manner the necessary movement distance between the feed position and the sliding position can be significantly minimized. The reduction of the movement distance leads to reduced time consumption for the movement so that at this key position saved time leads to a significantly reduced total time for the complete palletizing process. Particularly, the handover from the feed position into the sliding position is a temporal bottleneck with the complete palletizing device.

According to the present embodiments the filled sacks have to be understood as an element, which particularly represents a plastic sack, fabric sack, fleece sack or the like, which is for example filled with bulk material. The sacks are inserted and supplied in a row into the sliding device with the help of the conveyor belt. In the sliding device and particularly on the sliding area now a defined layer can be performed which comprises a composition in a row from single sacks. Via a sliding of this defined performed layer on the sliding area towards the sliding table the sliding area can be cleared for the performance of the next layer. The sliding table is particularly configured in a separable way so that it can be opened in order to release the layer downwards which configured and slided. A lifting device assembled underneath or a corresponding pallet can now take the layer so that the sack stacking can be performed in layers, layer for layer.

Naturally, the supply device can also comprise two or more conveyor belts like it is subsequently described in detail. With the use of two or more conveyor belts particularly a parallel assembly of the single conveyor belts towards one another is chosen so that in parallel the different rows can be inserted. Particularly, thereby all conveyor belts are equipped with the functionality according to the invention so that the time reduction can be achieved by the reduction of the movement distance between the feed position and the sliding position for all rows.

In contrast to the known solutions hereby the respective conveyor belt preferably extends through the frame into the palletizing device or into the sliding device. The feed position thereby approaches closer to the sliding position and with this manner results in the advantages explained herein.

Within the sliding device another conveyor device can be intended. Thereby it is for example possible that a sliding belt is intended in the sliding area which takes over the movement of the filled sacks from the feed position in the sliding position. Also other active and/or passive technical realizations of this movement are naturally possible within the scope of the present invention. Further, at least partially a banking by a further sack from the supply device particularly the conveyor belt can perform or at least partially perform the movement of the filled sack from the feed position in the sliding position. Naturally, also at least partially gravity conveyed movement possibilities are possible within the intention of the present embodiments so that in this area an at least partially as a tilted level performed sliding area can comply this moving function.

It can be an advantage when with a palletizing device according to the present embodiments the supply distance is performed smaller and/or equal to the half of the sliding distance. Thereby it has to be understood that the end of the conveyor belt extends so to say to a half over the frame into the sliding device. Since naturally the conveyor belts end on the outside of the frame, by this solution at least a halving of the necessary time can be achieved by a halving of the necessary movement distance between the feed position and the sliding position. With a reduction to a supply distance of this value particularly a good correlation between the technically increased effort on the one hand and the significantly considerable time reduction on the other hand can be achieved.

It is further of advantage when with a palletizing device according to the present embodiments the supply distance is smaller and/or equal to approximately 400 mm. This is a preferred solution as an absolute value in order to achieve a sufficient reduced moving distance and thereby a sufficient reduced time for this movement. Naturally, the supply distance is thereby always greater than 0 mm since otherwise the feed position and the sliding position would coincide. The smaller the supply distance is performed the greater is the temporal advantage by a corresponding further reduction of the movement distance between the feed position and the sliding position.

It is likewise an advantage when with a palletizing device according to the present embodiments the supply distance is performed between approximately 150 mm and approximately 250 mm, preferably between approximately 180 mm and 220 mm and more preferably particularly between 195 mm and 205 mm. It is preferred when the supply distance is performed in the area of approximately 200 mm. With this parameter area a particularly advantageous correlation between the additional constructive effort and the higher temporal reduction for the moving distance between the feed position and the sliding position can be achieved. Thereby these parameter areas comprise compromise solutions which provide a reasonable effort for the significant performance increase.

It is further an advantage when with the palletizing device according to the present embodiments the supply device comprises a calibration means, particularly with a calibration thread for a variation of the supply distance. A variation of the supply distance permits to use the palletizing device according to the invention even more flexibly. Thereby particularly with particular time critical palletizing tasks a reduction of the supply distance can be achieved for the palletizing task by the calibration means. Along with this correspondingly also the time loss for the movement between the feed position and the sliding position is reduced so that the complete palletizing time can be optimized. The calibration means for the variation can thereby for example comprise a calibration thread which varies the complete conveyor belt or only the edge of the conveyor belt in the desired direction. The adjusting device is particularly performed in translational direction and comprises for example an area between ±50 mm. In case as an optimal supply distance a value of 200 mm is chosen, this would enable a variation possibility between approximately 150 mm and approximately 250 mm. This adjustment can be performed manually and also by a motoric adaptation, for example of a threaded spindle. Thereby, via a wheel drive and a corresponding coupling also the gear or the gear device of the conveyor belt can be used for this calibration with the help of a calibration means. If more than one conveyor belt is used, particularly the calibrating means is performed so that all supply distances of all conveyor belts vary together and about the same or mainly the same value.

It is likewise an advantage when with a palletizing device according to the present embodiments the supply device comprises at least two conveyor belts, particularly mainly parallel adjusted to one another with an identical or mainly identical supply distance. With the parallel assembly of the conveyor belts it is possible to convey two or more rows of sacks at the same time on the sliding area. This leads to a further reduction of the whole palletizing time which can be positively correlated by a defined supply distance, particularly with the time reduction according to the invention. The amount of conveyor belts corresponds thereby particularly with the amount of rows per to be developed layer. In front of the supply device correspondingly for example a switch can be assembled, which distributes the corresponding filled sacks on the turning device or directly to the supply device or the conveyor belts from a common production device. The parallel performance of the conveyor belts can also include a performance with which the conveyor belts are directed from two different sides to the palletizing device or the sliding device. Basically the conveyor direction is freely choosable for each of the conveyor belts.

Another advantage can be achieved when with a palletizing device according to the present embodiments a sensor device is intended with sensor means for the recognition of the filled sacks in the feed position and with sensor means for the recognition of the filled sacks in the sliding position. Thereby it becomes possible to provide a parameter feedback for a controlled system. Particularly this can be used for a regulation of the supply device like also for a regulation of a sliding belt within the sliding device. Such sensor devices are particularly performed as optical sensor devices. So it is possible for example by the analysis of imaging methods to perform an explicit positioning determination of the filled sacks. In a simple manner also a usage of laser technique and simple light barriers is possible. Naturally also the sensor device can summarize the sensor means for the recognition of the feed position and for the recognition of the sliding position, so that a single common sensor means is performed for this registration. The sensor device or a corresponding control device can thereby directly define the supply distance by recognizing or mathematically determining, so that particularly in correlation with an automatically performed calibrating device like it is already described a regulation of a flexible variation possibility of the supply distance becomes possible with this sensor data.

It is further an advantage when with the palletizing device according to the present embodiments, the sliding area comprises at least a sliding belt for a movement of the filled sacks from the feed position into the sliding position. Like already previously described this is an active movement of the filled sacks along the supply distance. Thereby naturally also two or more sliding belts are possible which provide this functionality. Particularly for each conveyor belt of the supply device a corresponding sliding belt in the sliding area is assembled. Thereby it is possible that the further areas are smooth and thereby friction minimized in order to be able to perform a sliding or further sliding or a further sliding by contacting neighboring filled sacks in a particularly simple manner with less effort.

It is also an advantage when with a palletizing device according to the present embodiments the frame of the sliding device comprises a frame exception through which the supply edge of the conveyor belt extends. Such a frame is particularly a mechanically bearing structure of the palletizing device. Through the section a corresponding recess is provided through which the edge of the conveyor belt can extend in a geometrical manner. If the supply device comprises two or more conveyor belts, the corresponding recess for the frame section can be adjusted or be performed greater. However, also separate single frame sections specific for each conveyor belt within the sense of the present invention are possible. Naturally beneath the frame sections preferably also a mechanical stiffening, particularly in form of one or multiple reinforcement ribs can be assembled in order to compensate or particularly completely remove the weakening of the frame by this frame section from a mechanical point of view.

It is likewise an advantage when with a palletizing device according to the present embodiments underneath the sliding table a lifting device for the acceptance of the to be performed sack stacking is assembled. Thereby, this accepting can occur directly without a pallet and also via a pallet. The lifting device can thereby perform a translational lifting movement in order to accept the respective layer from the sliding table in a manner according to the invention during its opening movement directly underneath the sliding table. This leads to a reduced drop height and at the same time to a transportation possibility in translational height movement direction for the complete sack stacking. Thereby, the whole system can be performed with or without pallet. The lifting device can thereby naturally comprise a transportation possibility like for example transport rollers in order to transport the whole completed sack stacking laterally to the outside subsequent to the termination of the piling task.

BRIEF DESCRIPTION OF THE DRAWINGS

Further advantages, features and details of the invention result from the following description, in which with reference to the drawings embodiments of the invention are described in detail. Thereby, the features described in the claims and in the description can be each single or in any combination be essential for the invention. It is schematically shown:

FIG. 5 shows a calibrator and calibrating thread of the present embodiments.

DESCRIPTION OF SPECIFIC EMBODIMENTS OF THE INVENTION

Figure 1:
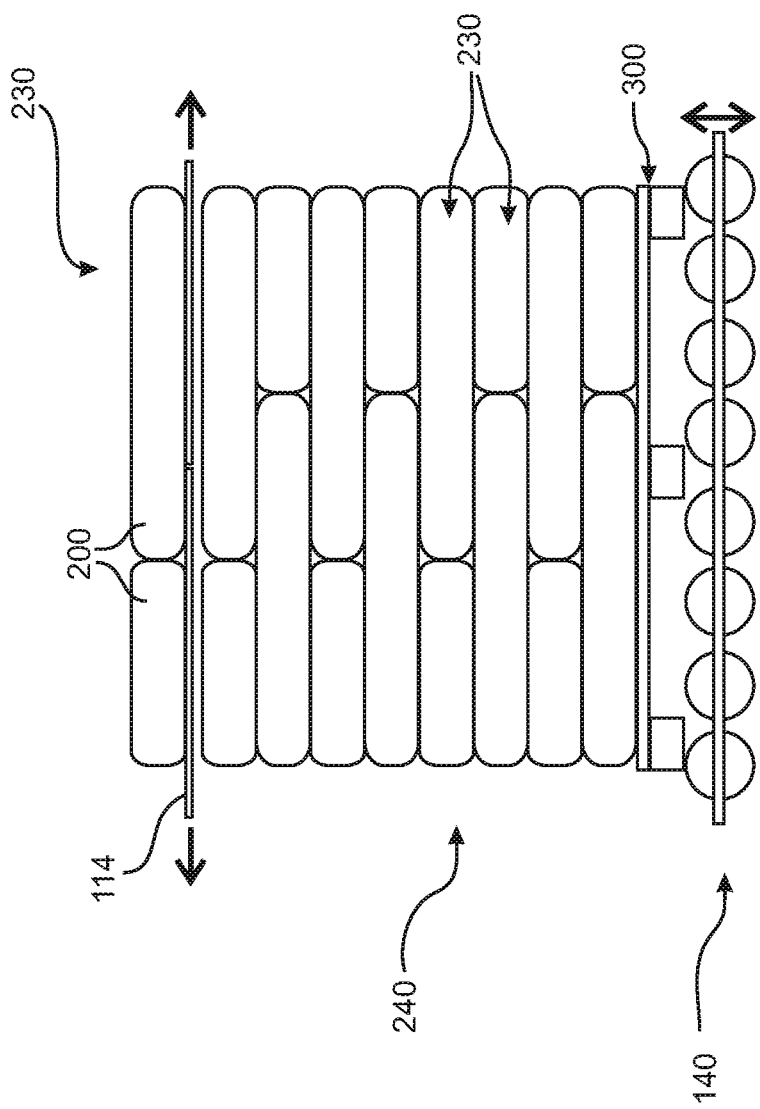
FIG. 1 a sack stacking performed by a palletizing device according to the invention during the performance of the last layer, FIG. 2 an embodiment of a palletizing device according to the invention, FIG. 3 the embodiment of FIG. 2 in a further proceeding state, and FIG. 4 the embodiment of FIG. 2 and FIG. 3 in detail.
Figure 2:
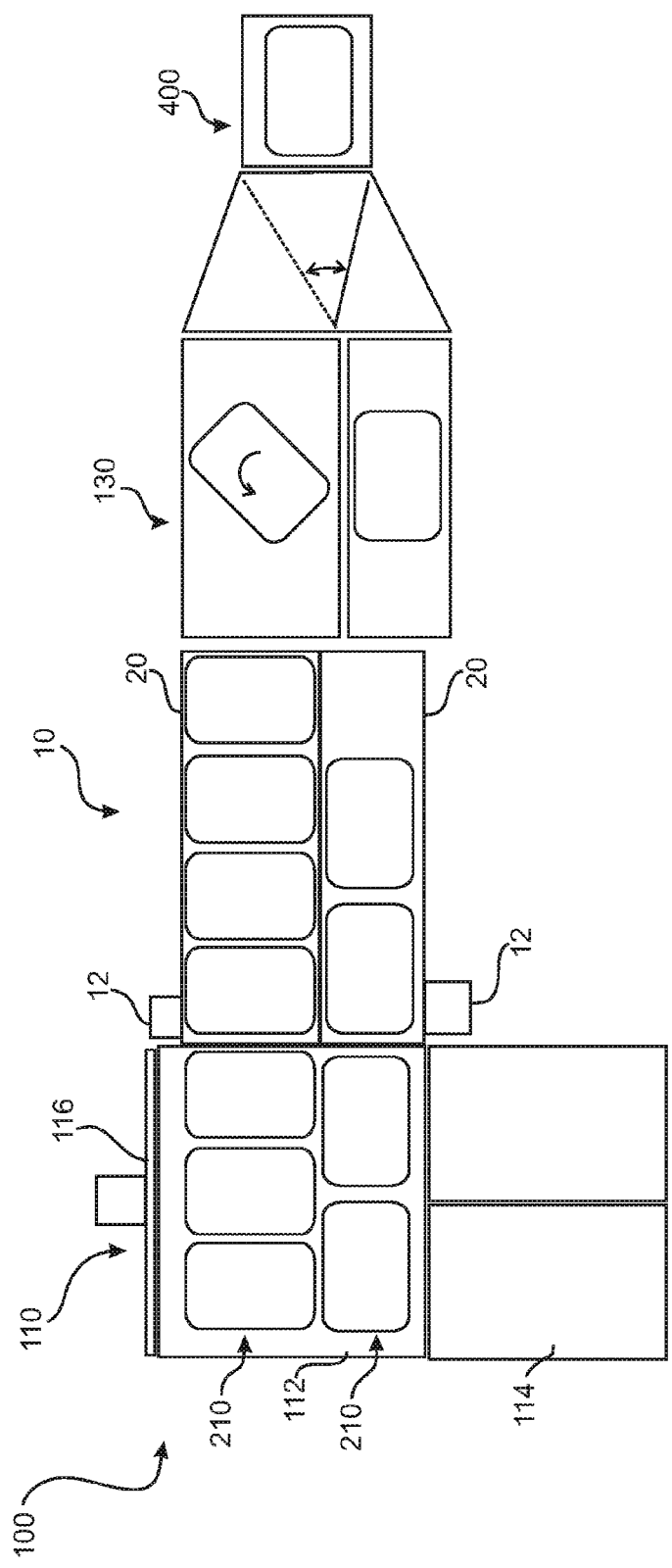
Figure 3:
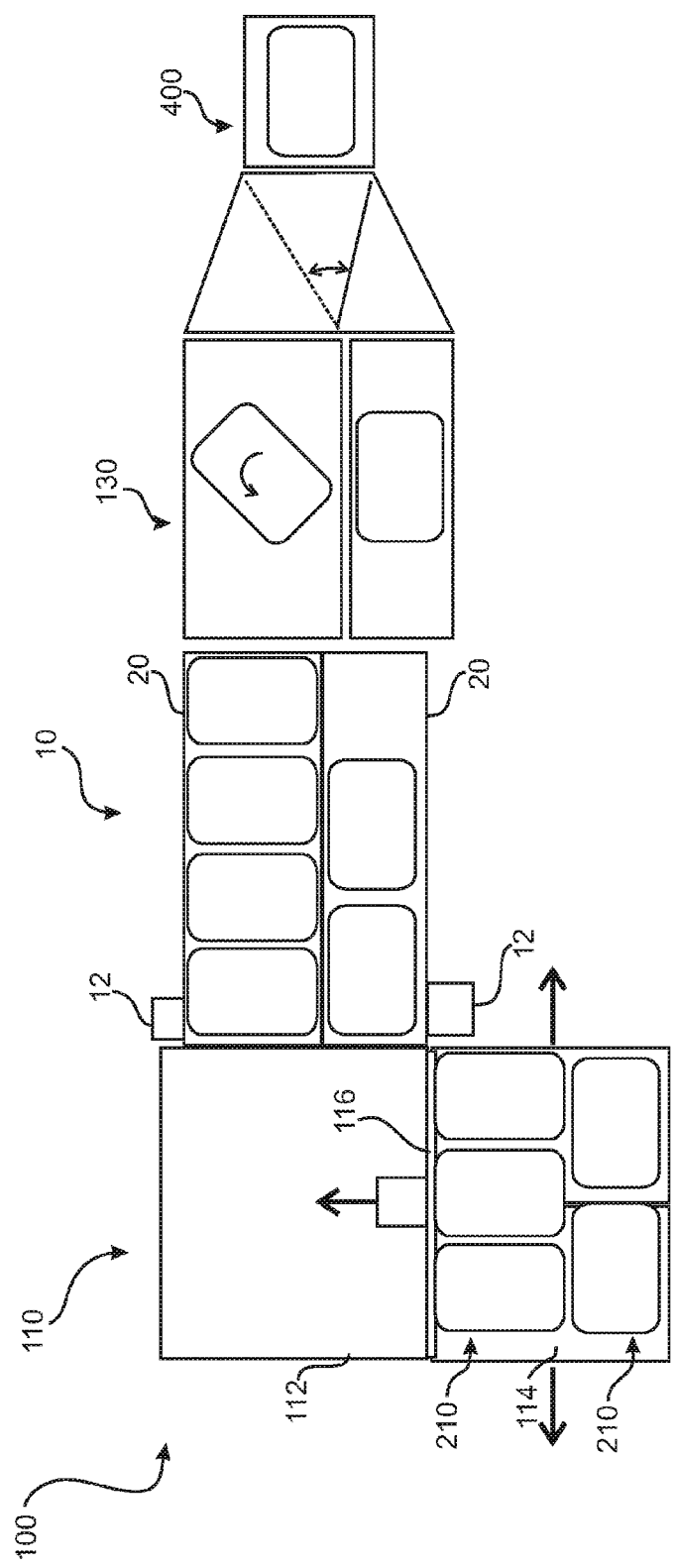

According to FIGS. 1 to 3 initially basically the functionality of the palletizing device according to the invention is described. So in FIG. 2 starting from the right a performing device 400 is intended which for example provides the filled sacks as a so called form-fill-and-seal-machine. Via a schematically shown switch now a distribution to two different conveyor belts 20 can occur. Upstream of these conveyor belts 20 is a rotating device 130 in order to bring the single filled sacks 200 in a desired different orientation. The orientation thereby depends on the corresponding overview of the layer 230, which should be performed in the sliding device 110 of the sliding area 112. Subsequently, after the corresponding turning of the rotating device 130 the single rows 210 of the sacks 200 can be conveyed in the palletizing device 100 particularly in the sliding device 110 via the conveyor belt 20 of the supply device 10.

FIG. 2 shows a completely performed layer 230 and two rows 210, which are already assembled in the sliding position S on the sliding area 112. Subsequently a slider 116 can convey the complete layer 230 in FIG. 2 downwards to the sliding table 114. If the layer 230 is now on the sliding table 114 like shown in FIG. 3 and FIG. 1, the slider 116 can be moved backwards in its starting position. The sliding area 112 is now ready for the acceptance of the next rows 210 of the sacks 200 with the help of the conveyor belts 20. Naturally the complete functionality can be performed also with only one single conveyor belt 20 in the supply direction 10 so that the slider 116 performs an intermediate movement for the performance of the respective layer 230 on the sliding area 112.

After the conveying of the layer 230 on the sliding table 114 this opens, so that the corresponding layer 230 can be passed downwards and is movable downwards with a lifting device 140 on a pallet 300. In this manner the whole sack stacking 240 is performed in layers.

Figure 4:
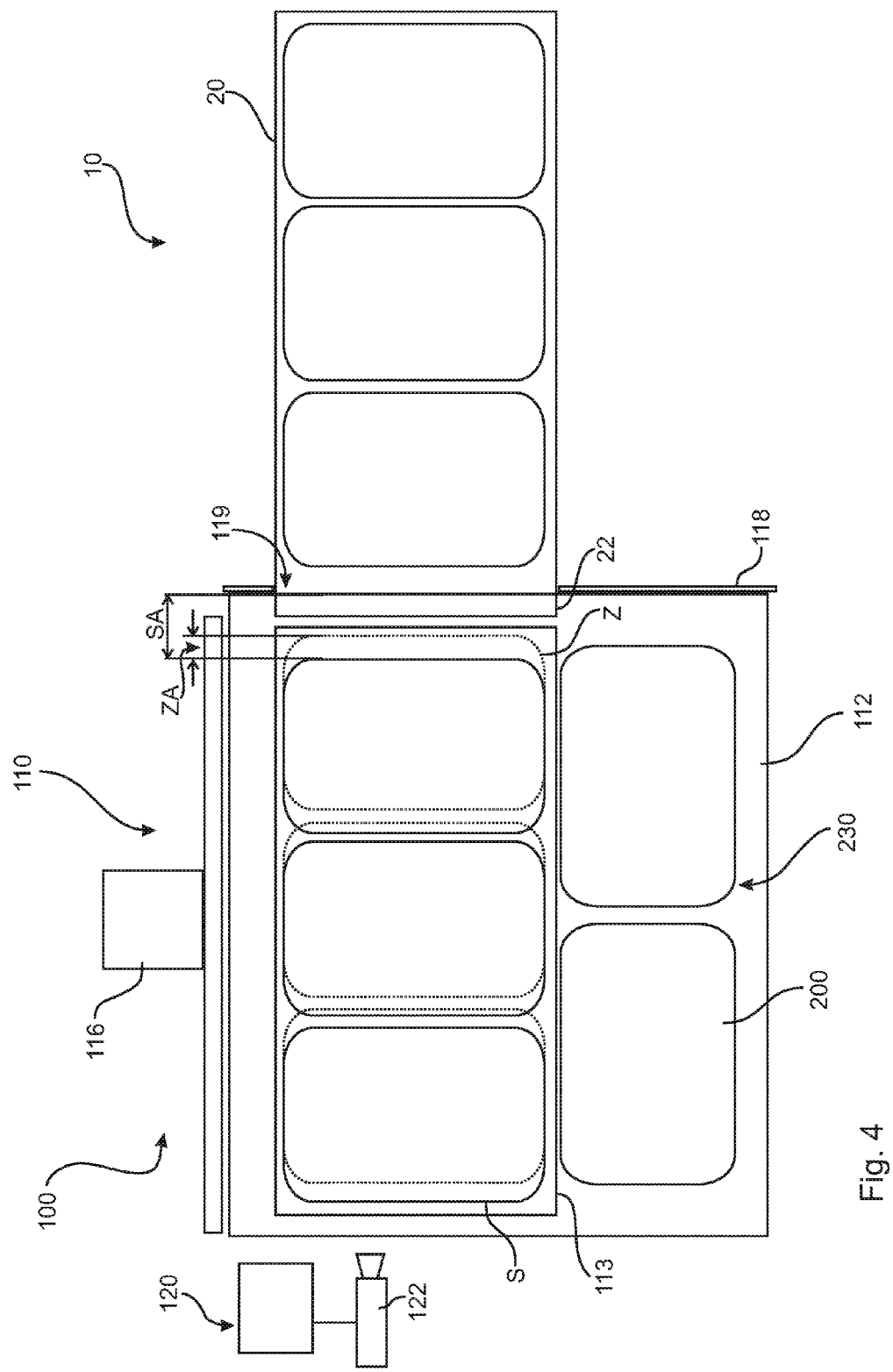

In FIG. 4 the functionality according to the invention can be recognized. Particularly here the correlation of the respective supply distance ZA and the sliding distance SA is to be recognized. Via a conveyor belt 20 of the supply device 10 the sacks 200 are supplied in the sliding device 110 and in a feed position Z, which is shown in a dashed manner. After this supply movement the row 210 of these sacks 200 is in a dashed position according to FIG. 4. Now the sliding area 112 of this embodiment of the sliding device 110 comprises a sliding belt 113, which is intended for the further movement of the feed position Z in the sliding position S (shown with a continuous line). As soon as this occurs, the already described sliding movement with a slider 116 and the further palletizing can occur.

Like it can be recognized the frame 118 comprises at the right side of the sliding device 110 a recess 119 through which the edge 22 of the conveyor belt 20 extends. This supply edge leads to the fact that the feed position Z is assembled with a shift to the left outside the frame 118 compared to the assembly of the conveyor belt 20. Thereby, also the supply distance ZA reduces to the value like it can be recognized in FIG. 4. Particularly, the supply distance ZA reduces in correlation to the sliding distance SA to a smaller value as this sliding distance SA. Like it can be recognized the supply distance ZA defines the necessary movement distance between the feed position Z and the sliding position S. This distance is diminished by the reduction according to the invention so that accordingly also the corresponding time for this movement can be reduced by the supply distance ZA. Since hereby it is basically about a time critical factor with the complete palletizing process, thereby the whole palletizing device 100 is speeded up concerning the performed palletizing process.

Reference is now made to FIG. 5 which illustrates calibrator 12 which is provided to the supply device. The calibrator 12 includes a calibration thread 13 to allow for variation of the supply distance for the conveyor belt. Specifically the calibrator may permit modification of the conveyor belt supply distance. The distance between the feed position and the sliding position may be smaller than the sliding distance between the sliding position and the frame of the sliding device at the supply edge of the conveyor belt.

The previous description of the embodiments describes the present invention only within the scope of examples. Naturally, also single features of the embodiments as far as technically meaningful can be freely combined with one another without leaving the scope of the present invention.

REFERENCE LIST

10 Supply device
12 Calibrating means
20 Conveyor belt
22 Supply edge
100 Palletizing device
110 Sliding device
112 Sliding area
113 Sliding belt
114 Sliding table
116 Slider
118 Frame
119 Frame section
120 Sensor device
122 Sensor means
130 Rotating device
140 Lifting device
200 Sack
210 Row
230 Layer
240 Sack stacking
300 Pallet
400 Performance device
S Sliding position
SA Sliding distance
Z feed position
ZA Supply distance

What is claimed is:

1. Palletizing device for a piling of layers from at least two rows of filled sacks to a stacking location where said rows are stacked, the palletizing device comprising a sliding device, the sliding device comprising a sliding area for the formation of a layer of filled sacks, and the palletizing device further comprising a supply device with at least one conveyor belt for the supply of filled sacks to a feed position on the sliding area, wherein the sliding device further comprises a sliding table a the sliding area and a slider for sliding of the filled sacks from a sliding position on the sliding area to the sliding table, wherein the conveyor belt extends beyond a frame of said supply device at a supply end of said conveyor belt into said sliding device to extend said feed position into said sliding device such that a remaining supply distance between said feed position and the sliding position, said remaining supply distance being finite, is smaller than the distance between the sliding position and said frame of the sliding device at the supply end of the conveyor belt, the sliding table being laterally offset from an alignment of said conveyor belt and said sliding position being aligned laterally with said sliding table, a lifting device being arranged below the sliding table for receiving the sack stack that is being formed.

2. Palletizing device according to claim 1, wherein
the supply distance is set as smaller or equal to half of the sliding distance.

3. Palletizing device according to claim 1, wherein
the supply distance is smaller than or equal to approximately 400 mm.

4. Palletizing device according to claim 1 wherein
the supply distance is one member of the group of distance ranges consisting of: between approximately 150 mm and approximately 250 mm, between approximately 180 mm and approximately 220 mm, and between approximately 195 mm and approximately 205 mm.

5. Palletizing device according to claim 1, wherein
the supply device comprises a calibrator.

6. Palletizing device according to claim 1, wherein
the supply device comprises at least two conveyor belts.

7. Palletizing device according to claim 1, wherein
a sensor device is provided with a sensor for detection of the filled sacks in the feed position and with a sensor for detection of the filled sacks in the sliding position.

8. Palletizing device according to claim 1, wherein
the sliding area comprises at least a sliding belt for a movement of the filled sack from the feed position in the sliding position.

9. Palletizing device according to claim 1, wherein
the frame of the sliding device comprises a frame section through which the supply edge of the conveyor belt extends.

10. Palletizing device according to claim 1, wherein
a lifting device is arranged below the sliding table for receiving the sack stack that is being formed.

11. Palletizing device according to claim 6, wherein said at least two conveyor belts, are assembled mainly parallel to one another with an identical or mainly identical supply distance.

* * * * *